(12) United States Patent
Fry

(10) Patent No.: US 7,680,469 B2
(45) Date of Patent: Mar. 16, 2010

(54) ELECTRONIC DEVICE POWER MANAGEMENT SYSTEM AND METHOD

(75) Inventor: Walter G. Fry, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 708 days.

(21) Appl. No.: 11/481,451

(22) Filed: Jul. 6, 2006

(65) Prior Publication Data

US 2008/0009304 A1    Jan. 10, 2008

(51) Int. Cl.
   *H01Q 11/12*    (2006.01)
   *H04B 1/38*    (2006.01)

(52) U.S. Cl. .................. 455/127.1; 455/127.5; 455/574

(58) Field of Classification Search ................. 455/572, 455/574, 127.1, 127.5, 272, 73, 67.11, 67.13, 455/522, 550.1
   See application file for complete search history.

(56) References Cited

U.S. PATENT DOCUMENTS

| | | | |
|---|---|---|---|
| 5,265,270 A | | 11/1993 | Stengel et al. |
| 5,276,920 A | | 1/1994 | Kuisma |
| 5,566,364 A | * | 10/1996 | Mizoguchi et al. .......... 455/132 |
| 5,625,881 A | | 4/1997 | Sandler et al. |
| 5,857,154 A | * | 1/1999 | Laborde et al. ............. 455/444 |
| 6,714,773 B1 | | 3/2004 | Ishida |
| 7,065,376 B2 | * | 6/2006 | Wolman et al. ............. 455/517 |
| 7,283,834 B2 | * | 10/2007 | Wolman et al. ............. 455/517 |
| 7,428,408 B2 | * | 9/2008 | Cha et al. ................... 343/702 |
| 2001/0055980 A1 | | 12/2001 | Sato |
| 2004/0204122 A1 | | 10/2004 | Opela et al. |
| 2005/0261038 A1 | | 11/2005 | Chary |
| 2006/0046736 A1 | | 3/2006 | Pering et al. |
| 2006/0072524 A1 | * | 4/2006 | Perahia et al. ............. 370/338 |
| 2006/0141968 A1 | | 6/2006 | Masaki |
| 2006/0276130 A1 | | 12/2006 | Waxman |
| 2007/0173199 A1 | * | 7/2007 | Sinha ...................... 455/67.11 |

OTHER PUBLICATIONS

International Search Report, dated Oct. 23, 2007.

* cited by examiner

*Primary Examiner*—Sonny Trinh

(57) ABSTRACT

An electronic device power management system, comprising a plurality of wireless transmitters and receivers and a power management module configured to selectively adjust the operational status of at least one of the plurality of wireless transmitters and receivers based on a signal indicative of at least one characteristic of a wireless network to which the electronic device is associated.

18 Claims, 3 Drawing Sheets

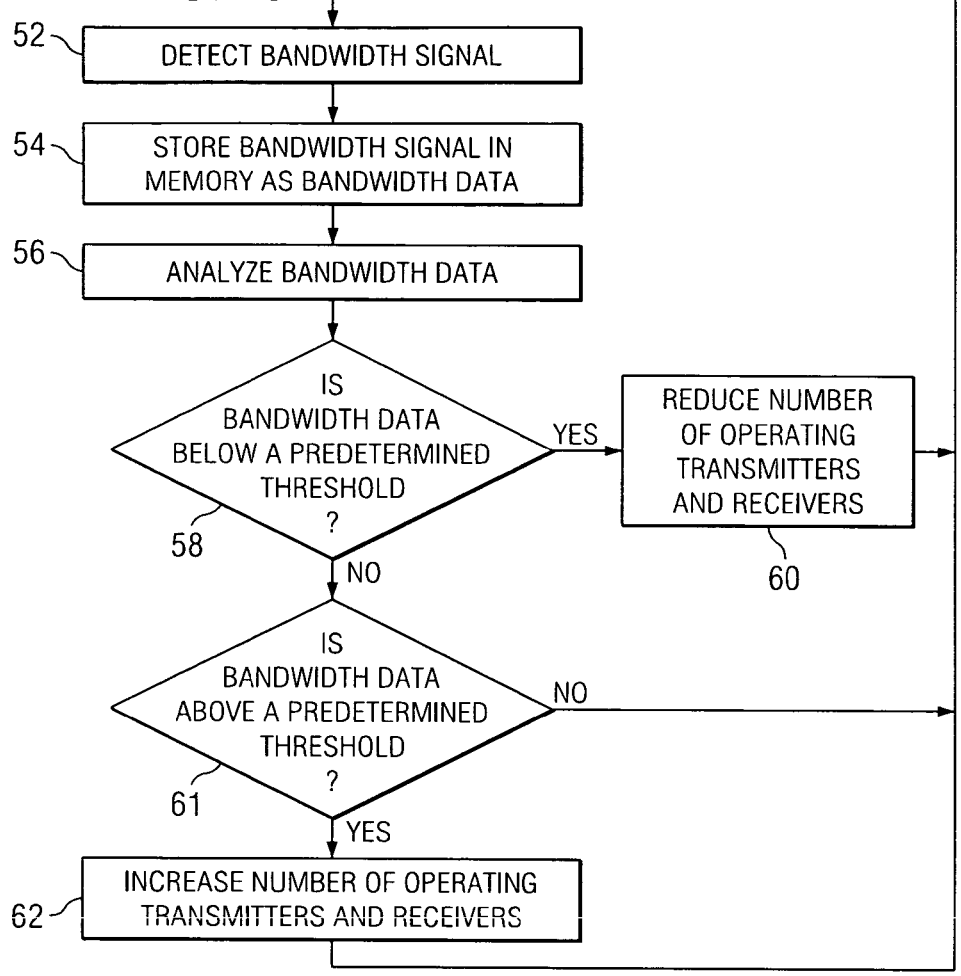
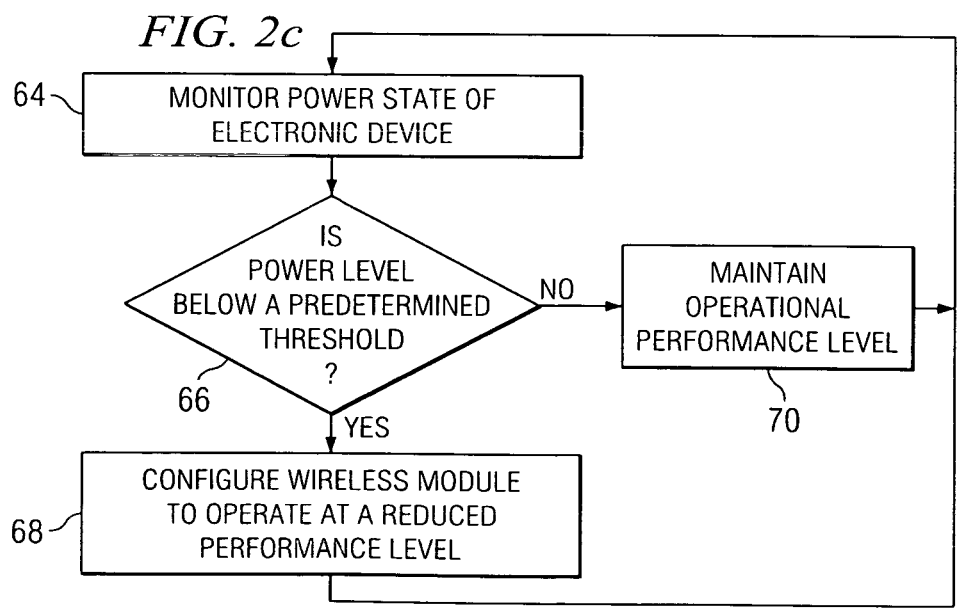

ELECTRONIC DEVICE POWER MANAGEMENT SYSTEM AND METHOD

BACKGROUND OF THE INVENTION

Wireless local area network (WLAN) cards can be configured having multiple antennas supporting a plurality radio frequency (RF) transmitters and receivers to increase the data transfer rate and/or range in which systems can receive/transmit data. However, an increase in the number of RF transmitters and receivers increases the overall power consumption by the system, thereby decreasing battery life.

BRIEF DESCRIPTION OF THE DRAWINGS

For a more complete understanding of the present invention, and the objects and advantages thereof, reference is now made to the following descriptions taken in connection with the accompanying drawings in which:

FIG. 2b is a flow diagram illustrating another embodiment of a power management method in accordance with the present invention; and FIG. 2c is a flow diagram illustrating yet another embodiment of a power management method in accordance with the present invention.

DETAILED DESCRIPTION OF THE DRAWINGS

Figure 1:
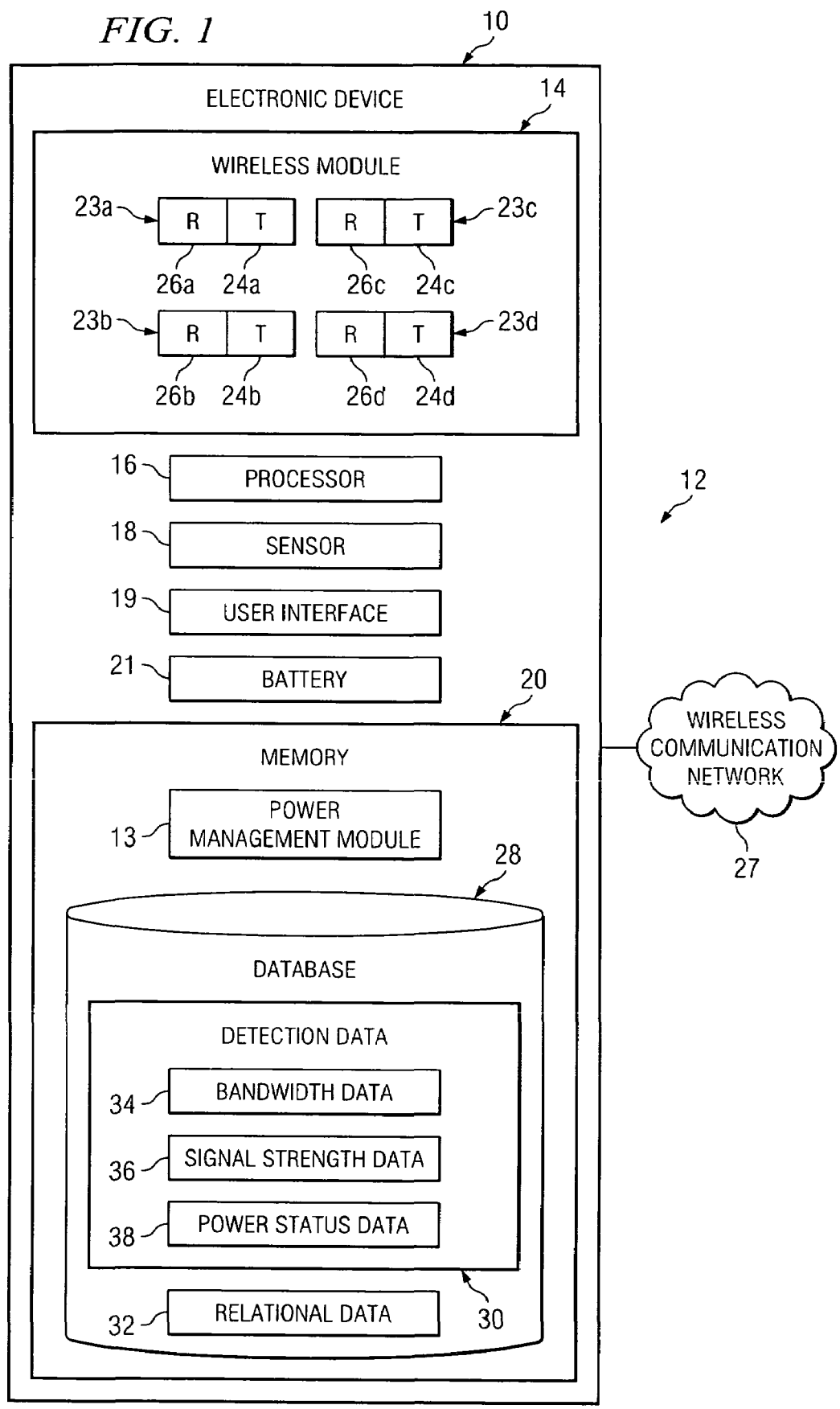
FIG. 1 is a block diagram of an electronic device in which an embodiment of a power management system is employed to advantage in accordance with the present invention.

The preferred embodiments of the present invention and the advantages thereof are best understood by referring to FIGS. 1-2c of the drawings, like numerals being used for like and corresponding parts of the various drawings.

FIG. 1 is a block diagram of an electronic device 10 in which an embodiment of a power management system 12 is employed to advantage in accordance with the present invention. Electronic device 10 may comprise any type of electronic device configured having wireless capabilities such as, but not limited to, a computer device, a personal digital assistant, a cellular telephone, notebook computer, tablet computer, or any other portable or non-portable electronic device. In the embodiment illustrated in FIG. 1, electronic device 10 comprises a wireless module 14, a processor 16, a sensor 18, a user interface 19, a memory 20 and a battery 21. In the embodiment illustrated in FIG. 1, wireless module 14 comprises a wireless local area network (WLAN) radio module (e.g., a 802.11 WLAN radio module) comprising multiple antennas 23a, 23b, 23c and 23d; however, it should be understood that wireless module 14 may comprise other types of modules. In the embodiment illustrated in FIG. 1, wireless module 14 comprises four antennas 23a, 23b, 23c and 23d, each comprising a radio transmitter 24a-24d and a radio receiver 26a-26d, respectively, to facilitate connection and/or association of electronic device 10 to a wireless communication network 27. However, it should be understood that a greater or fewer number of antennas may also be used and each antenna 23a-23d may comprise a greater or fewer number of radio transmitters 24 and/or receivers 26. Further, in FIG. 1, a single wireless module 14 is illustrated; however, it should be understood that embodiments of the present invention may be used for multiple wireless modules 14.

In the embodiment illustrated in FIG. 1, memory 20 comprises a power management module 13 and a database 28. Power management module 13 may comprise hardware, software, firmware or a combination thereof. In FIG. 1, power management module 13 is illustrated as being stored in memory 20 so as to be accessible and/or executable by processor 16. However, it should be understood that power management module 13 may be otherwise stored. Power management module 13 is used to process signals detected by sensor 18 to selectively operate (e.g., turn on/off transmitter(s) 24 and/or receiver(s) 26) to reduce power consumption by electronic device 10. For example, communication signals (e.g., voice and/or data) are transferred and/or routed between electronic device 10 and network 27 (e.g., an access point, tower or other communications element). Based on a characteristic of the network 27 communicatively connected to electronic device 10 (e.g., signal strength, bandwidth and/or data transfer rate, etc.), power management module 13 is used to selectively operate (e.g., turn on/off transmitter(s) 24 and/or receiver(s) 26) to reduce power consumption by electronic device 10.

In the embodiment illustrated in FIG. 1, database 28 comprises detection data 30 and relational data 32. Detection data 30 comprises information associated with signals collected and/or otherwise received by sensor 18 such as bandwidth data 34 (the amount of data capable of being passed along a communications channel), signal strength data 36 (the strength of a wireless signal associated with a particular access point), and electronic device 10 power status data 38 (e.g., whether electronic device 10 is being powered by a battery or other power source). Relational data 32 comprises information associated with known and/or predetermined signal values that are used to evaluate the detection data 30 to determine utilization of wireless transmitters 24 and receivers 26 (e.g., whether all transmitters 24 and receivers 26 are needed or whether some of wireless transmitters 24 and/or receivers 26 may be turned off to reduce power consumption by electronic device 10). For example, relational data 32 comprises known and/or predetermined signal strength values for operating a transmitter 24 and receiver 26 on a single antenna 23a, 23b, 23c or 23d for a 802.11g WLAN. Thus, for example, if signal strength data 36 is greater than the signal strength value stored in relational data 32 for operating a particular quantity of transmitters 24 and receivers 26 for an 802.11g WLAN, power management module 13 communicates and/or otherwise interfaces with processor 16 and/or wireless module(s) 14 to reduce the quantity of transmitters 24 and/or receivers 26 to reduce power consumption while maintaining wireless communication performance.

In the embodiment illustrated in FIG. 1, system 12 is dynamically responsive to changes in the available and/or connected network 27 (e.g., moving from one access point to another and/or relative to a single access point), changes in a power source (e.g., battery power or AC power), changes in battery power level, estimated life, etc. In operation, detection data 30 is compared to relational data 32 by power management module 13 to determine whether all or only a portion of the quantity of available transmitters 24 and/or receivers 26 should be utilized. If detection data 30 falls outside a predetermined value range indicated by relational data 32 for operating a particular quantity of transmitters 24 and/or receivers 26, power management module 13 transmits and/or otherwise generates a software interrupt or other signal to turn on/off at least one transmitter 24 and/or receiver 26 for one or more antennas 23a, 23b, 23c or 23d. For example, if sensor 18 detects a bandwidth value of 11 Mbps and wireless module 14 is configured for operation at 108 Mbps (e.g., utilizing four transmitters 24 and four receivers 26), power management module 13 generates and transmits a signal to processor 16 and/or wireless module 14 to turn off at least one transmitter 24 and/or at least one receiver 26 to reduce the power consumption by electronic device 10 (e.g., because operation of additional receiver(s) 26 and/or transmitter(s) 24 provides little or no appreciable increase in wireless communication performance). Preferably, power management module 13 is configured to automatically and selectively operate transmitters 24 and/or receivers 26. However, it should be understood that, additionally or alternatively, power management module 13 may be configured to enable a user to selectively operate transmitters 24 and/or receivers 26 via user interface 19. For example, in response to a notification of a decreasing battery power condition (e.g., a displayed icon or other indication of a battery power status), power management module 13 is configured to enable a user to selectively turn off transmitters 24 and/or receivers 26 to prolong battery usage.

Figure 2A:
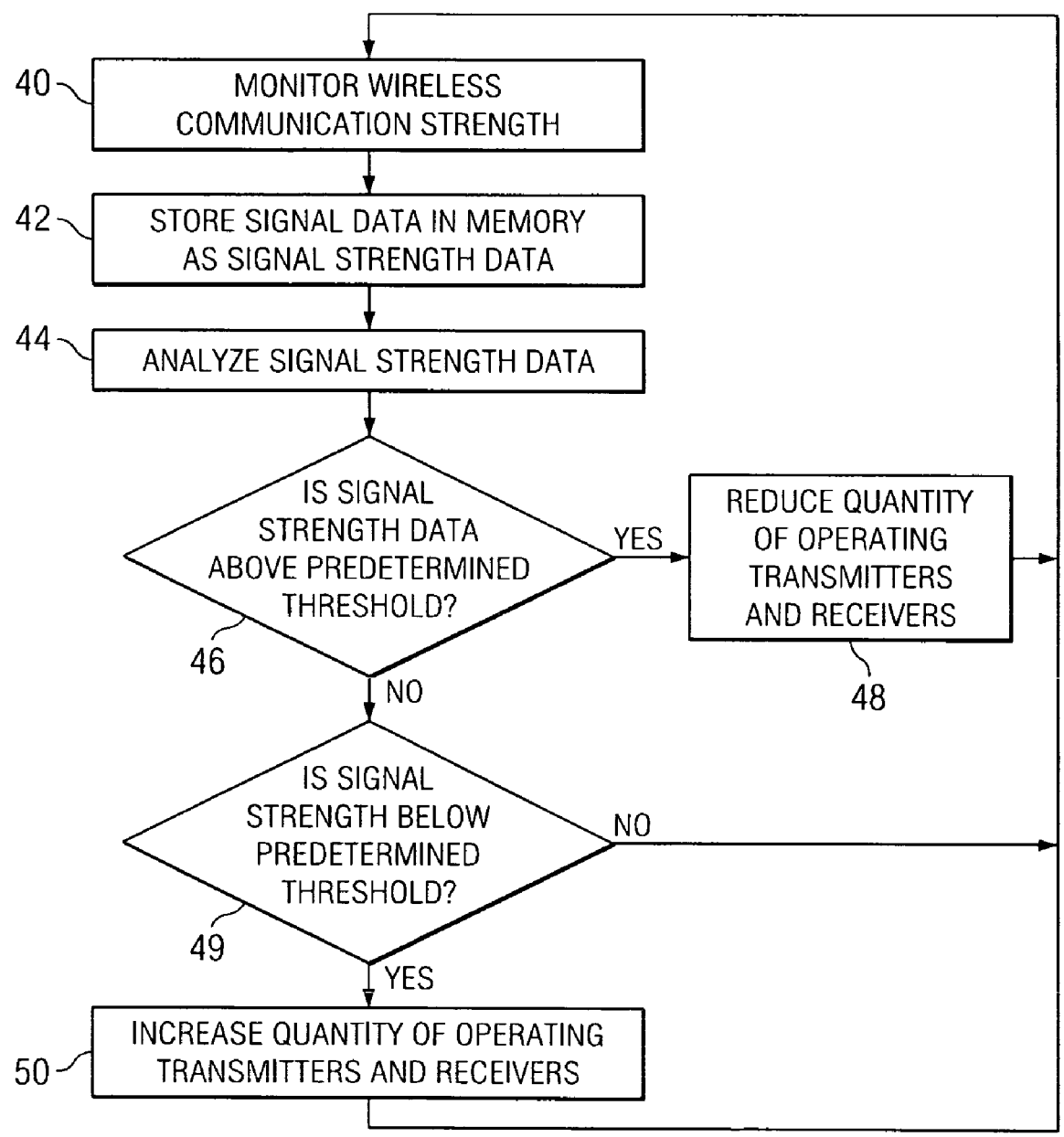
FIG. 2a is a flow diagram illustrating an embodiment of a power management method in accordance with the present invention.

FIG. 2a is a flow diagram illustrating an embodiment of a power management method in accordance with the present invention. In the embodiment illustrated in FIG. 2a, the method begins at block 40 where power management module 13 monitors detection data 30 acquired and/or otherwise detected by sensor 18. For example, in the embodiment illustrated in FIG. 2a, power management module 13 monitors wireless communication signal strength. At block 42, the signal strength information detected by sensor 18 is stored in memory 20 as signal strength data 36. At block 44, power management module 13 analyzes signal strength data 36 using relational data 32 to determine whether the quantity of operating wireless transmitters 24 and/or receivers 26 should be an increased or decreased based on the quantity of transmitters 24 and receivers 26 currently operating (e.g., reducing the quantity of transmitters 24 and receivers 26 operating without reduced connection speeds, etc.). At decisional block 46, power management module 13 makes a determination as to whether signal strength data 36 is above a predetermined threshold as defined by relational data 32 for the currently operating transmitters 24 and receivers 26 such that electronic device 10 may be operated using a decreased quantity of transmitters 24 and receivers 26. If the signal strength is above a predetermined threshold, the method proceeds to block 48, where power management module 13 sends a signal to processor 16 and/or wireless module(s) 14 to reduce the number of operating transmitters 24 and/or receivers 26 (e.g., turns off at least one transmitter 24 and/or receiver 26). The method proceeds to block 40 where power management module 13 continues monitoring detection data 30.

If the signal strength is not above a predetermined threshold for the currently operating transmitters 24 and receivers 26 as defined by relational data 32, the method proceeds from block 46 to decisional block 49, where power management module 13 makes a determination as to whether signal strength data 36 is below a predetermined threshold as defined by relational data 32 for the currently operating transmitters 24 and receivers 26. If signal strength data 36 is below a predetermined threshold, the method proceeds to block 50, where power management module 13 generates and transmits a signal to processor 16 and/or wireless module 14 to turn on one or more additional transmitters 24 and/or receivers 26. The method proceeds to block 40 where power management module 13 continues monitoring detection data 30. If signal strength data 36 is not below a predetermined threshold at decisional block 49, the method proceeds to block 40 where power management module 13 continues monitoring detection data 30 (e.g., no change to the quantity of currently operating transmitters 24 and receivers 26 is made).

FIG. 2b is a flow diagram illustrating another embodiment of power management method in accordance with the present invention. In the embodiment illustrated in FIG. 2b, wireless network capability is monitored and analyzed to determine and/or otherwise adjust the operational status of transmitters 24 and/or receivers 26 (e.g., whether the network operates at a high bandwidth, a low bandwidth, etc.). For example, the method begins at block 52, where sensor 18 detects a signal indicative of the bandwidth of a wireless network to which electronic device 10 is communicatively coupled. At block 54, the detected bandwidth signal is stored in memory as bandwidth data 34. At block 56, power management module 13 analyzes bandwidth data 34 relative to relational data 32 to determine whether a fewer or greater quantity of wireless transmitters 24 and/or receivers 26 should be operated based on the currently operating transmitters 24 and/or receivers 26. At decisional block 58, power management module 13 compares bandwidth data 34 to relational data 32 for the currently operating transmitters 24 and/or receivers 26 to determine whether the detected bandwidth 34 is below a predetermined value or threshold. For example, if an access point on a wireless network is capable of only a maximum performance of 11 Mbps (e.g., an 802.11b access point) but electronic device 10 is capable and/or otherwise operating to accommodate 108 Mbps, a reduction in the quantity of operating transmitters 24 and/or receivers 26 may be made with little or no appreciable decrease in wireless communication performance. Accordingly, at block 60, if the detected bandwidth data 34 is below a predetermined threshold, power management module 13 turns off, or causes to be turned off, at least one transmitter 24 and/or receiver 26 to reduce power consumption by electronic device 10. The method proceeds to block 52 where power management module 13 continues monitoring detection data 30. If the detected bandwidth data 34 is not below a predetermined threshold at decisional block 58, the method proceeds to decisional block 61, where power management module 13 determines whether bandwidth data 34 is above a predetermined threshold based on the currently operating transmitters 24 and receivers 26. If bandwidth data 34 is above a predetermined threshold, the method proceeds to block 62, where power management module 13 generates and transmits a signal to processor 16 and/or wireless module 14 to turn on one or more additional transmitters 24 and/or receivers 26. The method proceeds to block 52 where power management module 13 continues monitoring detection data 30. If bandwidth data 34 is not above a predetermined threshold at decisional block 61, the method proceeds to block 52 where power management module 13 continues monitoring detection data 30 (e.g., no change to the quantity of currently operating transmitters 24 and receivers 26 is made).

FIG. 2c is a flow diagram illustrating another embodiment of power management method in accordance with the present invention. In the embodiment illustrated in FIG. 2c, electronic device 10 may be configured to operate such that power management module 13 analyzes and/or adjusts the power consumption of electronic device 10 by adjusting the performance level and/or power consumption of wireless module 14 based on the power level of battery 21. Thus, as the available power from battery 21 decreases, power consumption of wireless module 14 can be reduced to increase the amount of useful battery life. For example, if the power level of battery 21 is below a predetermined threshold (e.g., 10%, 15%, 20%, etc. of available power life), it may be desirable to reduce the number of operating transmitters 24 and/or receivers 26 (e.g., operate at a reduced performance level) to extend use of device 10 using battery 21. Accordingly, in operation, if electronic device 10 is powered by battery 21, system 12 monitors the power level of battery 21, as indicated at block 64. At decisional block 66, if it is determined that battery power is below a predetermined threshold, power management module 13 reduces the power consumption of wireless module(s) 14 by reducing the quantity of operating transmitters 24 and/or receivers 26 to enable continued and prolonged use of wireless module 14 (e.g., even at a reduced performance level) as indicated at block 68. If it is determined that battery 21 is not below the predetermined threshold, the method proceeds to block 68 where wireless module 14 is configured to operate its current operational level and the method proceeds to block 64, where the power level of battery 21 continues to be monitored. It should also be understood that in some embodiments of the present invention, power management module 13 is configured to selectively increase the number of operating transmitters 24 and/or receivers 26 in response to an increase in available power (e.g., in response to a battery replacement, battery charging and/or a connected external power supply). Thus, embodiments of the present invention are dynamically responsive to the amount of power available to power electronic device 10.

In addition to monitoring the power level of battery 21, it should be understood that system 12 can be user configurable such that in the event that electronic device 10 is operating on battery power, the user can manually reduce the number of transmitters 24 and/or receivers 26 (e.g., to operate at a reduced performance level) to extend the amount of useful battery life.

It should be understood that in the methods depicted in FIGS. 2a-2c, various aspects and/or functions may be otherwise combined such that, for example, power management module 13 analyzes and/or otherwise utilizes multiple signals (e.g., signal strength, network bandwidth, and/or the power state of electronic device 10) to determine whether to adjust the quantity of operating transmitters 24 and receivers 26. For example, in the event that detected bandwidth data 34 is determined to be high thereby facilitating use of a greater number of transmitters 24 and/or receivers 26 to more fully utilize the connected network 27, but it is determined that electronic device 10 is operating at a reduced level of battery power, power management module 13 may communicate and/or otherwise interface with processor 16 and/or wireless module(s) 14 to reduce the number of transmitters and/or receivers to reduce power consumption to prolong useful battery life. It should be understood that various policies may be automatically configured and/or manually configured to evaluate multiple operating characteristics to determine whether to adjust the quantity of operating transmitters 24 and/or receivers 26.

Thus, embodiments of the present invention provide a power management module 13 configured to reduce power consumption of electronic device 10 based on a variety of characteristics of a network 27 to which the electronic device 10 is connected and/or various operating parameters of the device 10 itself. For example, based on a variety of characteristics of a network 27 to which the electronic device 10 is connected and/or various operating parameters of the device 10 itself, module 13 automatically adjusts the quantity of operating transmitters 24 and/or receivers 26 of device 10. Further, embodiments of the present invention enable adjustment of the quantity of operating transmitters 24 and/or receivers 26 manually to provide reduced power consumption.

What is claimed is:

1. An electronic device power management system in an electronic device, comprising:
a plurality of wireless transmitters and receivers; and
a power management module that selectively turns on and off at least one of the plurality of wireless transmitters and receivers based on a signal indicative of characteristics of a wireless network to which the electronic device is connected, wherein the signal is indicative of both a wireless communication signal strength with the wireless network and a wireless communication bandwidth value with the wireless network.

2. The system of claim 1, wherein the power management module reduces power consumption of the electronic device by turning off one or more of the plurality of wireless transmitters and receivers when the electronic device changes a power source from alternating current (AC) power to battery power.

3. The system of claim 1, wherein the power management module reduces power consumption of the electronic device by turning off one or more of the plurality of wireless transmitters and receivers based on a change in a battery power level of the electronic device.

4. The system of claim 1, wherein the power management module reduces power consumption of the electronic device by turning off a transmitter and a receiver when operation of the transmitter and the receiver provides no increase in wireless communication performance.

5. The system of claim 1, wherein the electronic device provides a notification to a user of a decreasing battery power condition to notify the user to prolong battery usage by selectively turning off a transmitter and a receiver.

6. The system of claim 1, wherein the power management module turns on and off one or more of the plurality of wireless transmitters and receivers in response to changes in a strength of a signal in the network system.

7. An electronic device power management system in an electronic device, comprising:
a plurality of means for transmitting and receiving a wireless communication signals; and
a means for managing power consumption of the electronic device, the power management means configured to turn on and off at least one of the plurality of transmitting and receiving means based on a signal indicative of characteristics of a wireless network to which the electronic device is connected, wherein the signal received by the power management means comprises both a wireless connection signal strength and a wireless connection bandwidth value.

8. The system of claim 7, wherein the power management means is configured to selectively turn on and off at least one of the plurality of transmitting and receiving means based on a level of power supply powering the electronic device.

9. The system of claim 7, wherein the power management means is configured to turn on and off at least one of the plurality of transmitting and receiving means based on a user input.

10. A power management method for an electronic device, comprising:
selectively turning on and turning off at least one of a plurality of wireless transmitters and receivers in the electronic device based on a signal indicative of characteristics of a wireless network to which the electronic device is associated, wherein the signal is indicative of both an amount of data capable of being transmitted along the wireless network to the electronic device and a strength of a wireless signal associated with an access point to which the electronic device is connected.

11. The method of claim 10, further comprising selectively turning on and turning off at least one of the transmitters and receivers based on a level of power supply powering the electronic device.

12. The method of claim 10, further comprising turning on and turning off at least one of the plurality of wireless transmitters and receivers based on a user input.

13. The method of claim 10, further comprising comparing the signal to relational data corresponding to currently operating wireless transmitters and receivers.

14. The method of claim 10, further comprising selectively increasing at least one of a quantity of operating wireless transmitters and receivers based on the signal.

15. An electronic device, comprising:
a plurality of wireless transmitters and receivers; and
a power management module that selectively turns on and off a plurality of wireless transmitters and receivers based on both a signal indicative of an amount of data capable of being transmitted along a wireless network to the electronic device and a strength of a wireless signal between an access point and the electronic device.

16. The electronic device of claim 15, wherein the power management module is dynamically responsive to a change in a level of power supply.

17. The electronic device of claim 15, wherein the power management module is configured to adjust an operational status of at least one of the plurality of wireless transmitters and receivers based on a user input.

18. The electronic device of claim 15, wherein the power management module is configured to selectively decrease at least one of a quantity of operating wireless transmitters and receivers based on a level of power supply.

* * * * *